(12) United States Patent
Ota

(10) Patent No.: US 8,677,407 B2
(45) Date of Patent: Mar. 18, 2014

(54) IMAGE DISPLAY APPARATUS AND METHOD FOR CONTROLLING THE SAME

(75) Inventor: Yuya Ota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1325 days.

(21) Appl. No.: 12/416,706

(22) Filed: Apr. 1, 2009

(65) Prior Publication Data
US 2009/0271824 A1 Oct. 29, 2009

(30) Foreign Application Priority Data
Apr. 24, 2008 (JP) ................. 2008-114417

(51) Int. Cl.
*G06F 3/00* (2006.01)
*G06F 13/00* (2006.01)
*H04N 5/445* (2011.01)

(52) U.S. Cl.
USPC ........................................................... 725/40

(58) Field of Classification Search
None
See application file for complete search history.

(56) References Cited

U.S. PATENT DOCUMENTS

| | | | | |
|---|---|---|---|---|
| 7,986,324 B2 * | 7/2011 | Funaki et al. | ................. | 345/440 |
| 2006/0258459 A1 * | 11/2006 | Davis et al. | ..................... | 463/40 |
| 2007/0168866 A1 * | 7/2007 | Khare et al. | .................. | 715/723 |
| 2008/0222680 A1 * | 9/2008 | Murakami | ....................... | 725/46 |
| 2008/0271074 A1 * | 10/2008 | Bae et al. | ........................ | 725/38 |
| 2009/0031380 A1 * | 1/2009 | Kim et al. | ..................... | 725/114 |
| 2009/0049476 A1 * | 2/2009 | Jung et al. | ........................ | 725/44 |
| 2009/0147137 A1 * | 6/2009 | Bae et al. | ...................... | 348/554 |
| 2009/0171225 A1 * | 7/2009 | Gadodia et al. | ................ | 600/508 |
| 2009/0225091 A1 * | 9/2009 | Noh et al. | ..................... | 345/522 |

FOREIGN PATENT DOCUMENTS

| | | |
|---|---|---|
| JP | 05-268431 | 10/1993 |
| JP | 2002-190889 | 7/2002 |
| JP | 2004-032104 | 1/2004 |
| JP | 2007-011967 | 1/2007 |

* cited by examiner

*Primary Examiner* — Brian Pendleton
*Assistant Examiner* — Ryan Stronczer
(74) *Attorney, Agent, or Firm* — Cowan, Liebowitz & Latman, P.C.

(57) ABSTRACT

There is provided an image display apparatus that receives a broadcast program and displays video images relating to the broadcast program. The image display apparatus comprises, among other things, a communication interface for communicating with a rendering apparatus that is externally connected; an input unit that receives image data for displaying graphic images from the rendering apparatus, the graphic images being different from the video images relating to the broadcast program; and a control unit that gives an instruction to the rendering apparatus, via the communication interface, to generate the image data, and obtains, via the input unit, image data generated by the rendering apparatus according to the instruction.

20 Claims, 3 Drawing Sheets

IMAGE DISPLAY APPARATUS AND METHOD FOR CONTROLLING THE SAME

BACKGROUND OF THE INVENTION

1. Field of the Invention

The present invention relates to an image display apparatus including a communication interface for communicating with a rendering apparatus, and to a method for controlling the image display apparatus.

2. Description of the Related Art

Televisions that display the graphics of a menu screen, an electronic program guide (EPG), and the like in addition to video images of a program have been in use. Recent televisions, especially digital televisions (DTVs), have a high resolution display, and are capable of displaying high-definition images. Thus, the quality demanded of the graphics of a menu screen, an electronic program guide, and the like has also increased.

A recording apparatus (for example, a DVD recorder) that renders the graphics of a menu screen, an electronic program guide, and the like; that outputs the rendered graphics to a television; and that causes the graphics to be displayed; is also known. Furthermore, a cellular phone that causes an external display device to render images has also been proposed (see Japanese Patent Laid-Open No. 2004-032104).

In general, an image display apparatus such as a DTV does not have very high graphic rendering ability. Although the rendering ability of an image display apparatus can be improved if a highly functional graphics card such as that provided in a personal computer (PC), a recent game console, or the like is provided, providing such a highly functional graphics card causes disadvantages such as increases in power consumption and cost. Because the main purpose of an image display apparatus such as a DTV is to display images, it is not favorable in a product to increase the graphic rendering ability when an improvement in graphic rendering ability causes such disadvantages.

The image display apparatus itself does not have to have high rendering ability when graphics rendered by an external apparatus are displayed on the image display apparatus, based on a conventional technique such as the one described in Japanese Patent Laid-Open No. 2004-032104. However, in this case, images displayed on the image display apparatus are different in every external apparatus, possibly having a negative impact on user convenience. For example, when an electronic program guide rendered by a recording apparatus is to be displayed on a DTV, the layout, the operation method, and the like of an electronic program guide differ for different recording apparatuses, possibly causing confusion on the part of the user. Also, consistency cannot be maintained between the graphics rendered by the image display apparatus itself and the graphics rendered by the external apparatus. For example, a layout, an operation method, and the like may be different between an electronic program guide rendered by the DTV, and an electronic program guide rendered by the recording apparatus, possibly causing confusion on the user's side.

Having been conceived in light of such circumstances, the present invention provides a technique for outputting an image rendered by an external rendering apparatus while inhibiting a negative impact on the user convenience of an image display apparatus.

SUMMARY OF THE INVENTION

It is a feature of the present invention to solve the conventional problems.

According to an aspect of the present invention, there is provided an image display apparatus that receives a broadcast program and displays video images relating to the broadcast program, the image display apparatus comprises: a communication interface for communicating with a rendering apparatus that is externally connected; an input unit that receives image data for displaying graphic images from the rendering apparatus, the graphic images being different from the video images relating to the broadcast program; a control unit that gives an instruction to the rendering apparatus, via the communication interface, to generate the image data, and obtains, via the input unit, image data generated by the rendering apparatus according to the instruction; an output unit that outputs the image data obtained by the control unit to a display unit; and a rendering unit that generates the image data; wherein the control unit determines whether or not the rendering apparatus is capable of generating the image data according to the instruction from the control unit, and when the rendering apparatus is incapable of generating the image data, the control unit gives an instruction to the rendering unit to generate the image data, and obtains the image data generated by the rendering unit according to the instruction.

Based on the above configuration, according to the present invention, an image rendered by an external rendering apparatus can be output while inhibiting a negative impact on the user convenience of an image display apparatus.

Further features of the present invention will become apparent from the following description of exemplary embodiments with reference to the attached drawings.

DESCRIPTION OF THE EMBODIMENTS

An embodiment of the present invention is described in the following with reference to the attached drawings.

First Embodiment

Figure 1:
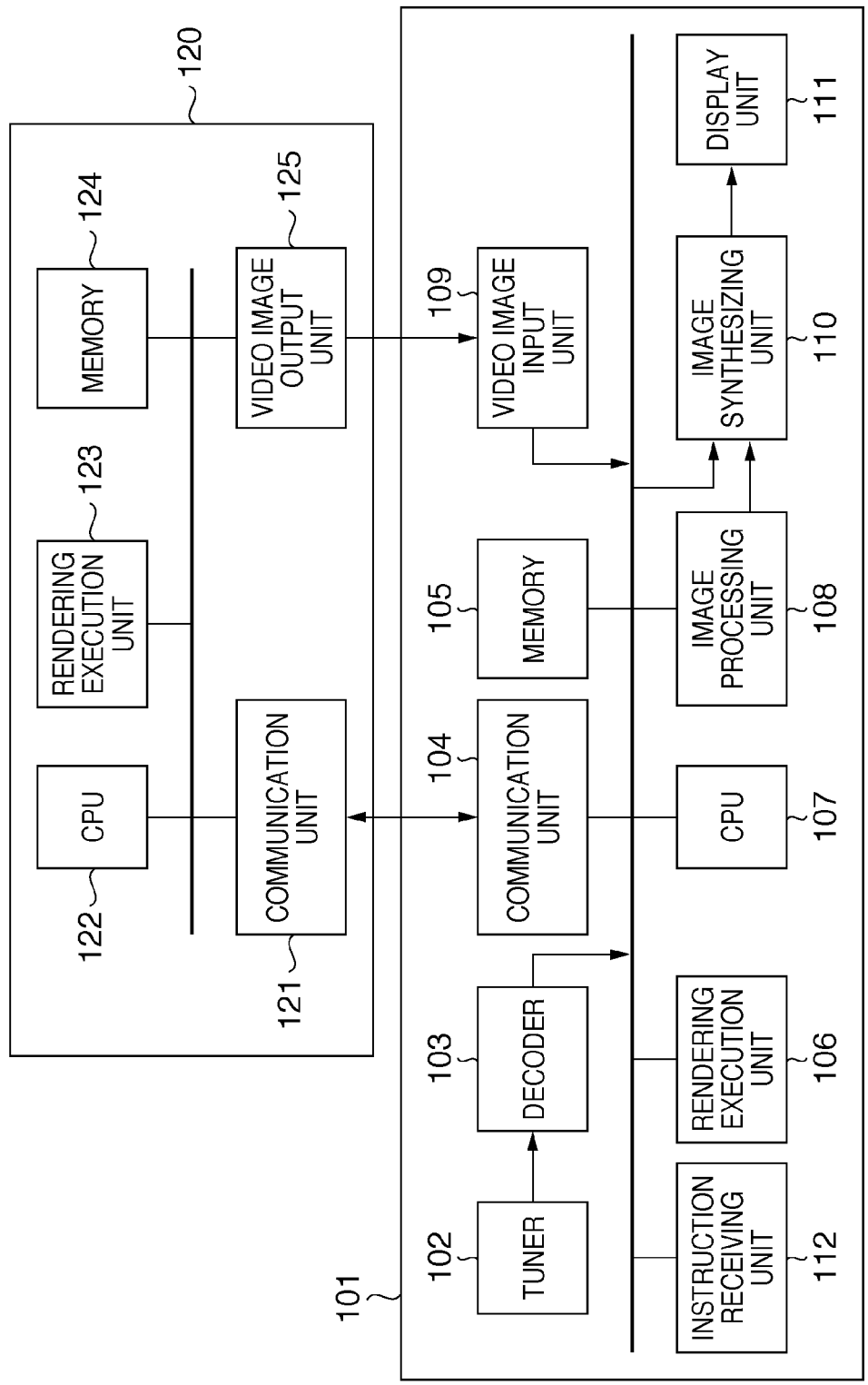
FIG. 1 is a block diagram illustrating the configuration of a digital television (DTV) according to the first embodiment of the present invention and a personal computer (PC) as an example of a rendering apparatus.

A description is given of an embodiment in which an image display apparatus of the present invention is applied to a DTV. FIG. 1 is a block diagram illustrating a configuration of a DTV 101 according to the first embodiment of the present invention and a PC 120 as an example of a rendering apparatus.

The DTV 101 receives the radio waves of a digital broadcast via a tuner 102 (broadcast receiving means). The contents of a channel selected at the tuner 102 are sent to a decoder 103 as a stream of, for example, MPEG-2.

The decoder 103 decodes the received stream, and the stream is stored in a memory 105 via a signal bus inside the DTV 101.

A CPU 107 and an image processing unit 108 in collaboration utilize the internal memory 105 as necessary as a frame memory, and applies image processing that is appropriate for program viewing to the decoded stream. The CPU 107, the memory 105, and the image processing unit 108 function as control units (control means).

The DTV 101 is also provided with a rendering execution unit 106 that renders the graphics (generates image data) of a menu screen, an electronic program guide, and so on. Therefore, the DTV 101 can render and display graphics without the PC 120. However, it is not necessary for the rendering ability of the rendering execution unit 106 to be very high compared with that of a rendering execution unit 123 of the PC 120 to be mentioned later (not excluding the rendering execution unit 106 with high rendering ability).

The DTV 101 is also provided with a communication unit 104 and a video image input unit 109 as communication interfaces. For example, a USB, IEEE 1394, HDMI, a wired LAN, or a wireless LAN is used for the communication interface, but the communication interface is not limited thereto.

It should be noted that HDMI is a communication interface for transmitting video images and provides a dedicated line called CEC for control, and an external device (PC 120) can be controlled by bidirectional communication using this signal line.

The video image data of a digital broadcast that has been image processed by the image processing unit 108 is synthesized as necessary by an image synthesizing unit 110 with graphics rendered by the rendering execution unit 106 or graphics received by the video image input unit 109. The image synthesizing unit 110 outputs image data obtained by synthesization processing to a display unit 111, and the display unit 111 displays images based on the image data. That is, the image synthesizing unit 110 also functions as an output means. When the tuner 102 is not receiving radio waves, the image synthesizing unit 110 may output only graphics to the display unit 111 without performing synthesization processing.

The DTV 101 is also provided with an instruction receiving unit 112 that receives instructions from a user via a remote control (not shown) and the like. The instruction receiving unit 112 receives, for example, a change instruction that instructs changes in the graphics that are being displayed on the display unit 111 (for example, the movement of a cursor in the menu screen).

The PC 120 is provided with a communication unit 121 for communicating with the communication unit 104.

The PC 120 is also provided with a rendering execution unit 123 that renders graphics (generates graphic image data), and outputs the graphics rendered to the video image input unit 109 from a video image output unit 125. The rendering ability of the rendering execution unit 123 is preferably higher than that of the rendering execution unit 106, but it is not absolutely required.

The PC 120 is also provided with a CPU 122 that controls the PC 120 entirely, and a memory 124 that is used as a work area by the CPU 122.

Figure 2:
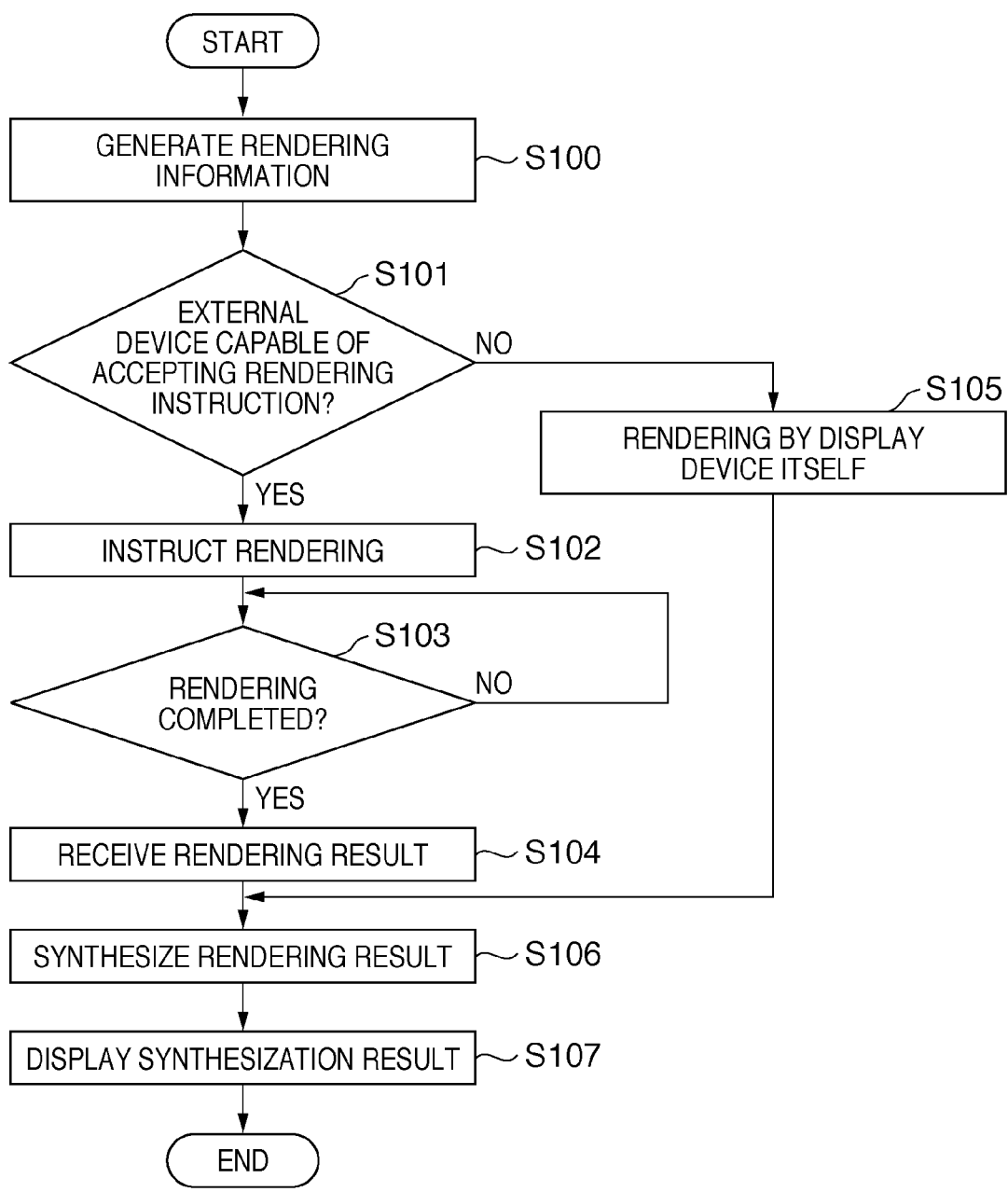
FIG. 2 is a flowchart illustrating the processing through which the DTV according to the first embodiment of the present invention obtains graphics (images) from a PC or an internal rendering execution unit.

FIG. 2 is a flowchart illustrating processing through which the DTV 101 according to the first embodiment of the present invention obtains graphics (images) from the PC 120 or the internal rendering execution unit 106. When the DTV 101 is instructed to display graphics (for example, when the instruction receiving unit 112 receives an instruction to render graphics), the processing of this flowchart begins.

In step S100, the CPU 107 generates information for rendering graphics (for example, an instruction set of OpenGL).

In step S101, the CPU 107 determines, via the communication unit 104, whether or not the PC 120 is capable of rendering (generating) graphics according to the instructions from the DTV 101. When the PC 120 is capable of rendering graphics, the process moves to step S102, and when the PC 120 is incapable of rendering graphics, the process moves to step S105.

In step S102, the CPU 107 instructs, via the communication unit 104, the PC 120 to render graphics. The PC 120 that received the instruction renders graphics through the rendering execution unit 123. For the rendering instruction, standard APIs (program interfaces) for rendering graphics such as OpenVG and OpenGL may be used, or other rendering information (for example, in the case of text, attribute information on font, color, size, and the like) may be used. Also, instructions based on unique protocols that are recognized by both the DTV 101 and the PC 120 to be connected may be used.

However, using the standard API, which is already specified, is advantageous in that it is widely applicable and allows various rendering apparatuses to be connected to the DTV 101.

In step S103, the CPU 107 waits until rendering of the graphics by the PC 120 is completed. At this time, when the rendering is completed, a completion notification may be sent to the DTV 101 from the PC 120, or the DTV 101 may check with the PC 120 at predetermined intervals.

In step S104, the CPU 107 receives the graphics rendered via the video image input unit 109.

When it is determined that the PC 120 is incapable of rendering graphics in step S101, the CPU 107 obtains graphics using the rendering execution unit 106 in step S105. Thus, the DTV 101 can generate and display graphics even when the PC 120 is not connected to the DTV 101, or when the PC 120 is executing other processes and is incapable of accepting instructions from the DTV 101.

In step S106, an image synthesizing unit 110 synthesizes the graphics obtained in step S104 or in step S105 with the video image (for example, video images of a television program) processed by the image processing unit 108, and obtains a synthesized video image.

In step S107, the display unit 111 displays the synthesized video image obtained in step S106.

Based on the above processing, the graphics of a menu screen, an electronic program guide, and the like are displayed on the DTV 101.

After displaying the graphics, when the instruction receiving unit 112 receives change instructions, it may be necessary for the DTV 101 to change the display content. For example, when an operation by a user such as the pressing down of a graphically illustrated button in the menu screen is performed, it is necessary that the DTV 101 display the menu screen with the button being pressed down.

Figure 3:
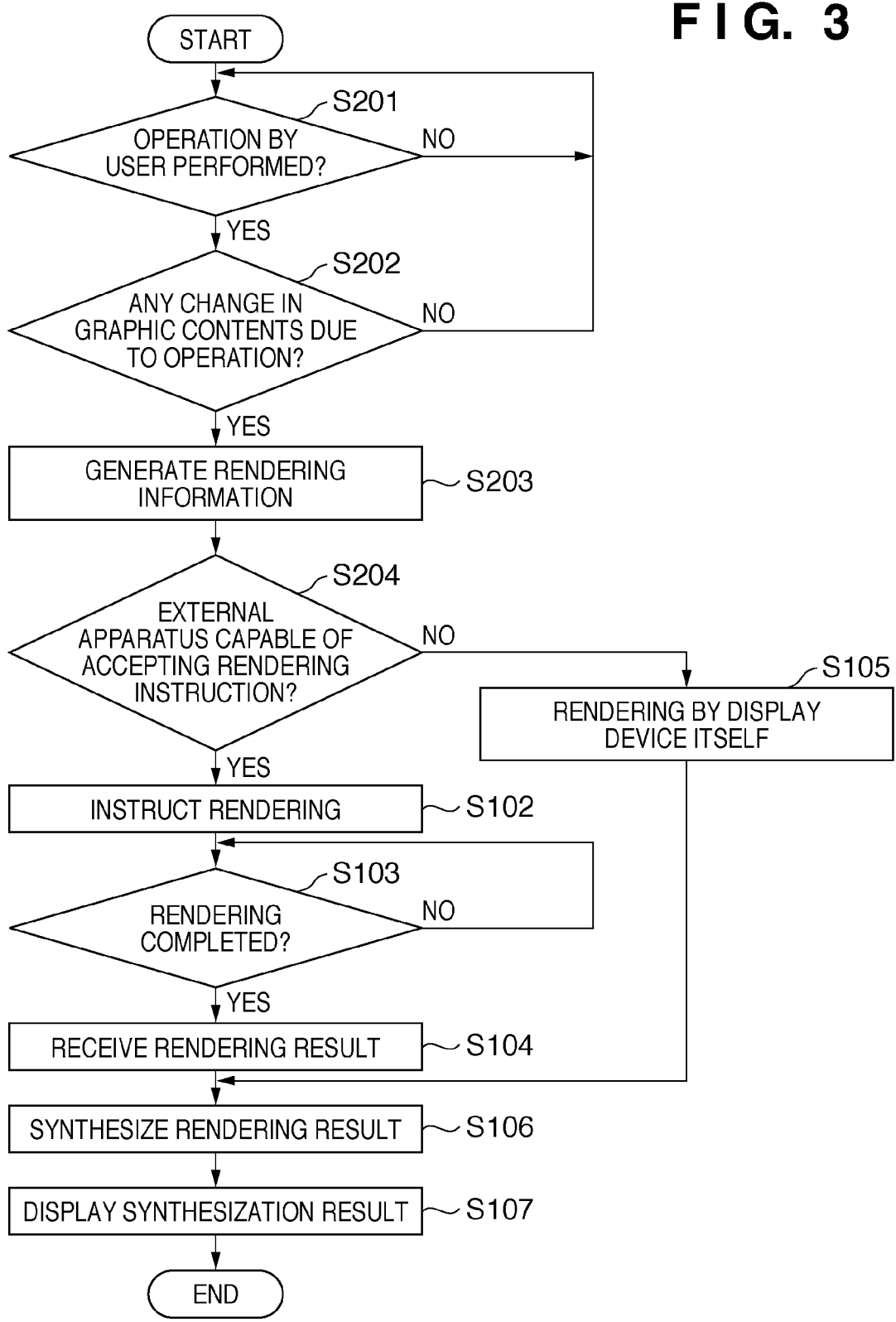
FIG. 3 is a flowchart illustrating graphics change processing by a DTV according to the first embodiment of the present invention.

FIG. 3 is a flowchart illustrating graphics change processing by the DTV 101 according to the first embodiment of the present invention. In FIG. 3, the same reference numerals are given for the processing that is the same as the processing in FIG. 2, and the descriptions thereof are omitted.

In step S201, the CPU 107 determines, via the instruction receiving unit 112, whether or not an operation on the graphics is performed by a user, and when an operation has been performed, the process moves to step S202.

In step S202, the CPU 107 determines whether or not the contents of the displayed graphics need to be changed. When it is necessary to change the graphics, the process moves to step S203, and when it is not necessary to change the graphics, the process returns to step S201.

In step S203, the CPU 107 generates information for rendering graphics after the change (for example, an instruction set of OpenGL).

In step S204, the CPU 107 determines, via the communication unit 104, whether or not the PC 120 is capable of rendering graphics according to the instructions from the DTV 101. When the PC 120 is capable of rendering graphics, the process moves to step S102, and when the PC 120 is incapable of rendering graphics, the process moves to step S105.

In this flowchart, when a user performs an operation, and when it is necessary to change the contents of the graphics, it is checked every time if the PC 120 is capable of accepting a rendering instruction. Therefore, even when the status of the PC 120 is changed while a user is operating a menu screen and the like (for example, the PC 120 is cut off or newly connected), the DTV 101 can appropriately select the rendering execution unit 106 or the PC 120 and can obtain graphics.

As described above, according to this embodiment, the DTV 101 determines the graphics to be rendered (that is, generates rendering information), allows the PC 120 to render graphics, and outputs the rendered graphics. That is, the PC 120 is allowed to render the graphics determined by the DTV 101 itself.

Thus, graphics rendered by an external rendering apparatus can be output while inhibiting a negative impact on the user convenience of an image display apparatus.

Furthermore, the image display apparatus can obtain high quality graphics, using an external rendering apparatus with high graphic rendering ability.

Other Embodiment

The processing described in the above embodiments may be realized by providing a storage medium, storing the program codes of software realizing the above-described functions, to a computer system or apparatus.

The functions of the above-described embodiments can be realized by making a computer (or a CPU or MPU) of the system or apparatus read the program codes stored in the storage medium and execute them. In this case, the program codes read from the storage medium realize the functions according to the embodiments, and the storage medium storing the program codes constitutes the invention.

A storage medium, such as a Floppy® disk, a hard disk, an optical disk, a magneto-optical disk and the like can be used for providing the program codes. Also, a CD-ROM, a CD-R, a magnetic tape, a non-volatile memory card, a ROM, and the like can be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-114417, filed on Apr. 24, 2008, which is hereby incorporated by reference herein in its entirety.

What is claimed is:

1. An image display apparatus that receives a broadcast program and displays a video image relating to the broadcast program, the image display apparatus comprising:

a communication unit configured to communicate with an external rendering apparatus that is connected to the image display apparatus;

an instruction receiving unit configured to receive an instruction to display a predetermined image on a display unit;

a rendering unit configured to generate a first graphic image corresponding to the predetermined image, the first graphic image being different from the video image relating to the broadcast program;

an input unit configured to receive a second graphic image corresponding to the predetermined image from the external rendering apparatus, the second graphic image being different from the video image relating to the broadcast program;

a control unit configured to, in a case where the instruction receiving unit received the instruction to display the predetermined image on the display unit, determine whether or not the external rendering apparatus is capable of generating the second graphic image, and acquire the first graphic image from the rendering unit or acquire the second graphic image from the external rendering apparatus based on the determination result; and an output unit that outputs the first graphic image or the second graphic image acquired by the control unit to the display unit, wherein in a case where the external rendering apparatus is capable of generating the second graphic image, the control unit sends an instruction via the communication unit to the external rendering apparatus to generate the second graphic image, and acquires the second graphic image from the external rendering apparatus via the input unit, and in a case where the external rendering apparatus is incapable of generating the second graphic image, the control unit sends an instruction to the rendering unit to generate the first graphic image, and acquires the first graphic image from the rendering unit.

2. The image display apparatus according to claim 1, wherein in a case where a change instruction to change the predetermined image displayed on the display unit is received by the instruction receiving unit, the control unit determines whether or not the external rendering apparatus is capable of generating a changed second graphic image that is changed according to the change instruction;

in a case where the external rendering apparatus is capable of generating the changed second graphic image, the control unit sends an instruction via the communication unit to the external rendering apparatus to generate the changed second graphic image, and acquires the changed second graphic image from the external rendering apparatus via the input unit; and in a case where the external rendering apparatus is incapable of generating the changed second graphic image, the control unit sends an instruction to the rendering unit to generate a changed first graphic image that is changed according to the change instruction, and acquires the changed first graphic image from the rendering unit.

3. The image display apparatus according to claim 1, wherein the output unit synthesizes the first graphic image or the second graphic image acquired by the control unit with the video images the video image relating to the broadcast program, and outputs the synthesized image to the display unit.

4. The image display apparatus according to claim 1, wherein the control unit sends an instruction to the external rendering apparatus to generate the second graphic image using an application program interface in compliance with OpenGL or OpenVG.

5. The image display apparatus according to claim 1, wherein rendering ability of the rendering unit of the image display apparatus is lower than that of the external rendering apparatus.

6. A method for controlling an image display apparatus that receives a broadcast program, and displays a video image relating to the broadcast program, the image display apparatus including a communication unit configured to communicate with an external rendering apparatus that is connected to the image display apparatus, an instruction receiving unit configured to receive an instruction to display a predetermined image on a display unit, a rendering unit configured to generate a first graphic image corresponding to the predetermined image, the first graphic image being different from the video image relating to the broadcast program, and an input unit configured to receive a second graphic image corresponding to the predetermined image from the external rendering apparatus, the second graphic image being different from the video image relating to the broadcast program, the method comprising steps of:
   in a case where the instruction receiving unit received the instruction to display the predetermined image on the display unit, determining whether or not the external rendering apparatus is capable of generating the second graphic image;
   in a case where the external rendering apparatus is capable of generating the second graphic image, sending an instruction via the communication unit to the external rendering apparatus to generate the second graphic image, and acquiring the second graphic image from the external rendering apparatus via the input unit;
   in a case where the external rendering apparatus is incapable of generating the second graphic image, sending an instruction to the rendering unit to generate the first graphic image, and acquiring the first graphic image from the rendering unit; and
   outputting the acquired first graphic image or the acquired second graphic image to the display unit.

7. The method according to claim 6, further comprising:
   in a case where a change instruction to change the predetermined image displayed on the display unit is received by the instruction receiving unit, determining whether or not the external rendering apparatus is capable of generating a changed second graphic image that is changed according to the change instruction;
   in a case where the external rendering apparatus is capable of generating the changed second graphic image, sending an instruction via the communication unit to the external rendering apparatus to generate the changed second graphic image, and acquiring the changed second graphic image from the external rendering apparatus via the input unit; and
   in a case where the external rendering apparatus is incapable of generating the changed second graphic image, sending an instruction to the rendering unit to generate a changed first graphic image that is changed according to the change instruction, and acquiring the changed first graphic image from the rendering unit.

8. The method according to claim 6, wherein the step of outputting synthesizes the acquired first graphic image or the acquired second graphic image with the video image relating to the broadcast program, and outputs the synthesized image to the display unit.

9. The method according to claim 6, wherein in the step of sending an instruction to the external rendering apparatus to generate the second graphic image, the instruction is sent using an application program interface in compliance with OpenGL or OpenVG.

10. The method according to claim 6, wherein rendering ability of the rendering unit of the image display apparatus is lower than that of the external rendering apparatus.

11. An image display apparatus comprising:
   a communication unit configured to communicate with an external rendering apparatus that is connected to the image display apparatus;
   an instruction receiving unit configured to receive an instruction to display a predetermined image on a display unit;
   a rendering unit configured to generate a first graphic image corresponding to the predetermined image;
   an input unit configured to receive a second graphic image corresponding to the predetermined image from the external rendering apparatus;
   a control unit configured to, in a case where the instruction receiving unit received the instruction to display the predetermined image on the display unit, determine whether or not the external rendering apparatus is capable of generating the second graphic image, and acquire the first graphic image from the rendering unit or acquire the second graphic image from the external rendering apparatus based on the determination result; and
   an output unit that outputs the first graphic image or the second graphic image acquired by the control unit to the display unit,
   wherein in a case where the external rendering apparatus is capable of generating the second graphic image, the control unit sends an instruction via the communication unit to the external rendering apparatus to generate the second graphic image, and acquires the second graphic image from the external rendering apparatus via the input unit, and
   in a case where the external rendering apparatus is incapable of generating the second graphic image, the control unit sends an instruction to the rendering unit to generate the first graphic image, and acquires the first graphic image from the rendering unit.

12. The image display apparatus according to claim 11, wherein in a case where a change instruction to change the predetermined image displayed on the display unit is received by the instruction receiving unit, the control unit determines whether or not the external rendering apparatus is capable of generating a changed second graphic image that is changed according to the change instruction;
   in a case where the external rendering apparatus is capable of generating the changed second graphic image, the control unit sends an instruction via the communication unit to the external rendering apparatus to generate the changed second graphic image, and acquires the changed second graphic image from the external rendering apparatus via the input unit; and
   in a case where the external rendering apparatus is incapable of generating the changed second graphic image, the control unit sends an instruction to the rendering unit to generate a changed first graphic image that is changed according to the change instruction, and acquires the changed first graphic image from the rendering unit.

13. The image display apparatus according to claim 11, wherein the output unit synthesizes the first graphic image or the second graphic image acquired by the control unit with the video image relating to the broadcast program, and outputs the synthesized image to the display unit.

14. The image display apparatus according to claim 11, wherein the control unit sends an instruction to the external rendering apparatus to generate the second graphic image using an application program interface in compliance with OpenGL or OpenVG.

15. The image display apparatus according to claim 11, wherein rendering ability of the rendering unit of the image display apparatus is lower than that of the external rendering apparatus.

16. A method for controlling an image display apparatus, the image display apparatus including a communication unit configured to communicate with an external rendering apparatus that is connected to the image display apparatus, an instruction receiving unit configured to receive an instruction to display a predetermined image on a display unit, a rendering unit configured to generate a first graphic image corresponding to the predetermined image, and an input unit configured to receive a second graphic image corresponding to the predetermined image from the external rendering apparatus, the method comprising steps of:

in a case where the instruction receiving unit received the instruction to display the predetermined image on the display unit, determining whether or not the external rendering apparatus is capable of generating the second graphic image;

in a case where the external rendering apparatus is capable of generating the second graphic image, sending an instruction via the communication unit to the external rendering apparatus to generate the second graphic image, and acquiring the second graphic image from the external rendering apparatus via the input unit;

in a case where the external rendering apparatus is incapable of generating the second graphic image, sending an instruction to the rendering unit to generate the first graphic image, and acquiring the first graphic image from the rendering unit; and outputting the acquired first graphic image or the acquired second graphic image to the display unit.

17. The method according to claim 16, further comprising:

in a case where a change instruction to change the predetermined image displayed on the display unit is received by the instruction receiving unit, determining whether or not the external rendering apparatus is capable of generating a changed second graphic image that is changed according to the change instruction;

in a case where the external rendering apparatus is capable of generating the changed second graphic image, sending an instruction via the communication unit to the external rendering apparatus to generate the changed second graphic image, and acquiring the changed second graphic image from the external rendering apparatus via the input unit; and in a case where the external rendering apparatus is incapable of generating the changed second graphic image, sending an instruction to the rendering unit to generate a changed first graphic image that is changed according to the change instruction, and acquiring the changed first graphic image from the rendering unit.

18. The method according to claim 16, wherein the step of outputting synthesizes the acquired first graphic image or the acquired second graphic image with the video image relating to the broadcast program, and outputs the synthesized image to the display unit.

19. The method according to claim 16, wherein in the step of sending an instruction to the external rendering apparatus to generate the second graphic image, the instruction is sent using an application program interface in compliance with OpenGL or OpenVG.

20. The method according to claim 16, wherein rendering ability of the rendering unit of the image display apparatus is lower than that of the external rendering apparatus.

* * * * *